(12) United States Patent
Kwon (10) Patent No.: US 9,036,546 B2
(45) Date of Patent: May 19, 2015

(54) SYSTEM AND METHOD FOR DEVICE DISCOVERY FOR DEVICE-TO-DEVICE COMMUNICATION IN A CELLULAR NETWORK

(75) Inventor: Young Hoon Kwon, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 428 days.

(21) Appl. No.: 13/343,585

(22) Filed: Jan. 4, 2012

(65) Prior Publication Data

US 2013/0170398 A1 Jul. 4, 2013

(51) Int. Cl.
*H04W 4/00* (2009.01)
*H04L 12/28* (2006.01)
*H04W 8/00* (2009.01)
*H04W 76/02* (2009.01)

(52) U.S. Cl.
CPC .............. *H04W 8/005* (2013.01); *Y02B 60/44* (2013.01); *H04W 76/023* (2013.01)

(58) Field of Classification Search
None
See application file for complete search history.

(56) References Cited

U.S. PATENT DOCUMENTS

| 2009/0016249 | A1 | 1/2009 | Li et al. | |
|---|---|---|---|---|
| 2009/0264070 | A1 | 10/2009 | Lim | |
| 2009/0319616 | A1* | 12/2009 | Lewis et al. | 709/206 |
| 2010/0227594 | A1 | 9/2010 | De Vries | |
| 2011/0081920 | A1 | 4/2011 | Hung et al. | |
| 2011/0217992 | A1 | 9/2011 | Fraccaroli | |
| 2011/0246611 | A1 | 10/2011 | Jabara et al. | |
| 2013/0064138 | A1* | 3/2013 | Hakola et al. | 370/255 |
| 2014/0029471 | A1* | 1/2014 | Tavildar et al. | 370/255 |

OTHER PUBLICATIONS

International Search Report and Written Opinion received in Patent Cooperation Treaty Application No. PCT/US13/20324, Mar. 26, 2013, 9 pages.
Belleschi, Marco, et al., "Performance Analysis of a Distributed Resource Allocation Scheme for D2D Communications," 2011 IEEE Globecom Workshops, Dec. 5-9, 2011, Citation, 2 pages.
Belleschi, Marco, et al., "Performance Analysis of a Distributed Resource Allocation Scheme for D2D Communications," 2011 IEEE Globecom Workshops, Dec. 5-9, 2011, pp. 358-362.
Fodor, Gabor, et al., "Design Aspects of Networks Assisted Device-to-Device Communications," IEEE Communications Magazine, Mar. 2012, pp. 170-177.
Kjeldskov, Jesper, et al. "Just-for-Us: A Context-Aware Mobile Information System Facilitating Sociality," Mobile HCI'05, Sep. 19-22, 2005, pp. 23-30.

(Continued)

*Primary Examiner* — Jutai Kao
(74) *Attorney, Agent, or Firm* — Slater & Matsil, L.L.P.

(57) ABSTRACT

An embodiment of a system enables a user equipment to employ a buddy list to initiate a D2D discovery process. The user equipment constructs a buddy list including other user equipments with which the user equipment would desire to communicate employing a D2D communication link. The user equipment transmits the buddy list to a serving base station. The user equipment transmits a request to the serving base station that it desires to communicate over a D2D communication link with a second user equipment that is on the buddy list. The user equipment receives D2D link setup information from the serving base station for the communication link with the second user equipment. The user equipment transmits a beacon signal employing the D2D link setup information.

20 Claims, 5 Drawing Sheets

(56) References Cited

OTHER PUBLICATIONS

Fitzek, F.H.P., et al., • Cellular Controlled Short-Range Communication for Cooperative P2P Networking,• Wireless Personal Communications, vol. 48, No. 1, Jan. 26, 2008, 5 pages.

IEEE Standard for Information technology-Telecommunications and Information exchange between systems-Local and metropolitan area netwoks-Specific requirements, Part 11: Wireless LAN Medium Access Control (MAC) and Physical Layer (PHY) Specifications, IEEE Std 802.11tm-2007, Jun. 12, 2007, 1,232 pages.

Pekka, J., et al., •Interference-aware resource allocation for device-to-devive radio underlaying cellular networks,• IEEE, 2009, pp. 1-5.

Wu, X., et al., •FlashlinQ: A Synchronous Distributed Scheduler for Peer-to-Peer Ad Hoc Neworks.• Forty-Eighth Annual Allerton Conference, Allerton House, UIUC, Sep. 29-Oct. 1, 2010, pp. 514-521.

* cited by examiner

SYSTEM AND METHOD FOR DEVICE DISCOVERY FOR DEVICE-TO-DEVICE COMMUNICATION IN A CELLULAR NETWORK

TECHNICAL FIELD

The present invention relates generally to a system and method for digital communications, and more particularly to a system and method for device-to-device operations in a wireless communication system.

BACKGROUND

In the field of wireless communication, there has been increasing demand for direct device-to-device ("D2D") communication. Direct device-to-device communication refers to a communication mode between user equipments ("UEs") that does not include a base station in a communication path between the UEs. D2D communication has the potential to enable a cellular network to offload a portion of its base station traffic. In addition to offloading base-station traffic, D2D communication also enables proximity-based advertisement for local business entities, which can be a revenue source for such entities. D2D communication can also enable an end user of a user equipment to find and identify nearby friends. Ad hoc-type services can also be provided among user equipments that are physically near each other.

Processes to provide performance enhancements for D2D communication would accelerate adoption of this communication form in the marketplace. A process that would reduce signaling to enable a user equipment to establish a D2D communication link with a neighboring user equipment would accelerate adoption of this efficient communication mode.

SUMMARY OF THE INVENTION

These and other problems are generally solved or circumvented, and technical advantages are generally achieved, by embodiments of the present invention which provides a system and method for device-to-device operations in a wireless communication system.

In accordance with an example embodiment of the present invention, a method for a base station in a wireless communication system to employ a buddy list received from a user equipment to determine when to initiate a device-to-device discovery process for the user equipment is provided. The method includes receiving a buddy list from the user equipment to determine when to initiate the device-to-device discovery process for the user equipment. The buddy list includes the ID of another UE with which the first UE would desire to be connected using a D2D communication link. A processor in the base station determines when to initiate a D2D discovery process for the first UE and the other UE that is on the buddy list. The determination when to initiate a D2D discovery process can be in response to a request received from the UE that it desires to communicate with the another UE. The processor in the base station constructs a combined buddy list for UEs operating within the coverage area of the base station and transmits the combined buddy list to an adjacent base station.

In accordance with a further example embodiment of the present invention, a method for a UE in a wireless communication system to employ a buddy list to determine when to initiate a device-to-device discovery process for another user equipment is provided. The method includes constructing a buddy list including other UEs with which the UE would desire to communicate employing a D2D communication link. The UE or its operator communicates the buddy list to a serving base station/the network, either wirelessly or via an on-line account. The UE receives D2D link setup information from the serving base station for the communication link with another UE that is on its buddy list, and transmits a beacon signal employing the D2D link setup information.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Direct device-to-device communication enables a cellular network to offload traffic to a wireless communication path without the need to insert a base station in the communication link between UEs. D2D communication can also enable easy data transfers to and from diverse peripheral devices such as printers, cameras, personal computers, television receivers, . . . , etc., that are colocated in the physical environment of the end user. Nonetheless, cellular operators generally desire to have D2D communications under their control for purposes of billing and accounting, management of carrier frequencies and interference, and overall management of network traffic to optimize available bandwidths.

It would be advantageous for a base station to reduce communication with user equipments desiring to communicate with each other. It would be further advantageous for a user equipment to reduce signaling that is performed when a user equipment desires to establish a D2D communication link with a neighboring user equipment.

To facilitate D2D communication between end users, a UE can be enabled, as described in co-pending patent application Ser. No. 13/343,554, entitled "System and Method for Device-to-Device Communication Overlaid on a Cellular Network," filed Jan. xx, 2012, to operate temporarily as a personal femtocell base station so that it can communicate with another UE that is within its nearby physical neighborhood. The co-pending patent application is hereby incorporated herein by reference. The result enables two UEs to communicate directly with each other without the need to establish a communication path through an evolved base station ("eNB"). One UE operates as if it is an eNB, creating thereby a Personal Cell ("PC"), a form of a femtocell, and the other UE operates in the served area of the first UE, i.e., in the PC that was created for the first UE. The first UE's data is transmitted on a normal cellular downlink resource, and the second UE's data is transmitted on a normal cellular uplink resource. The eNB allocates and transmits the necessary information and resources to the first UE for the first UE to set up its PC. The eNB may also allocate and transmit necessary information and resources to the second UE to set up the PC.

In a Personal Cell, one UE operates as a serving UE, (a "PCS-UE") and one or more PC client UEs ("PCC-UEs") operate in the personal cell created for the first UE. A PCS-UE is a UE in a PC that acts as an eNB. A PCC-UE is a UE in a PC that acts as a UE. Both the PCS-UE and the PCC-UE retain a direct cellular communication link with their serving eNB. At a given time, both the PCS-UE and the PCC-UE are switched back to normal cellular communication with their respective original cellular eNB. The result is a D2D communication link between the two UEs.

PC and regular cellular operations may employ a time-division multiplex ("TDM") or other, e.g., frequency-division multiplex ("FDM") modulation format.

Figure 1:
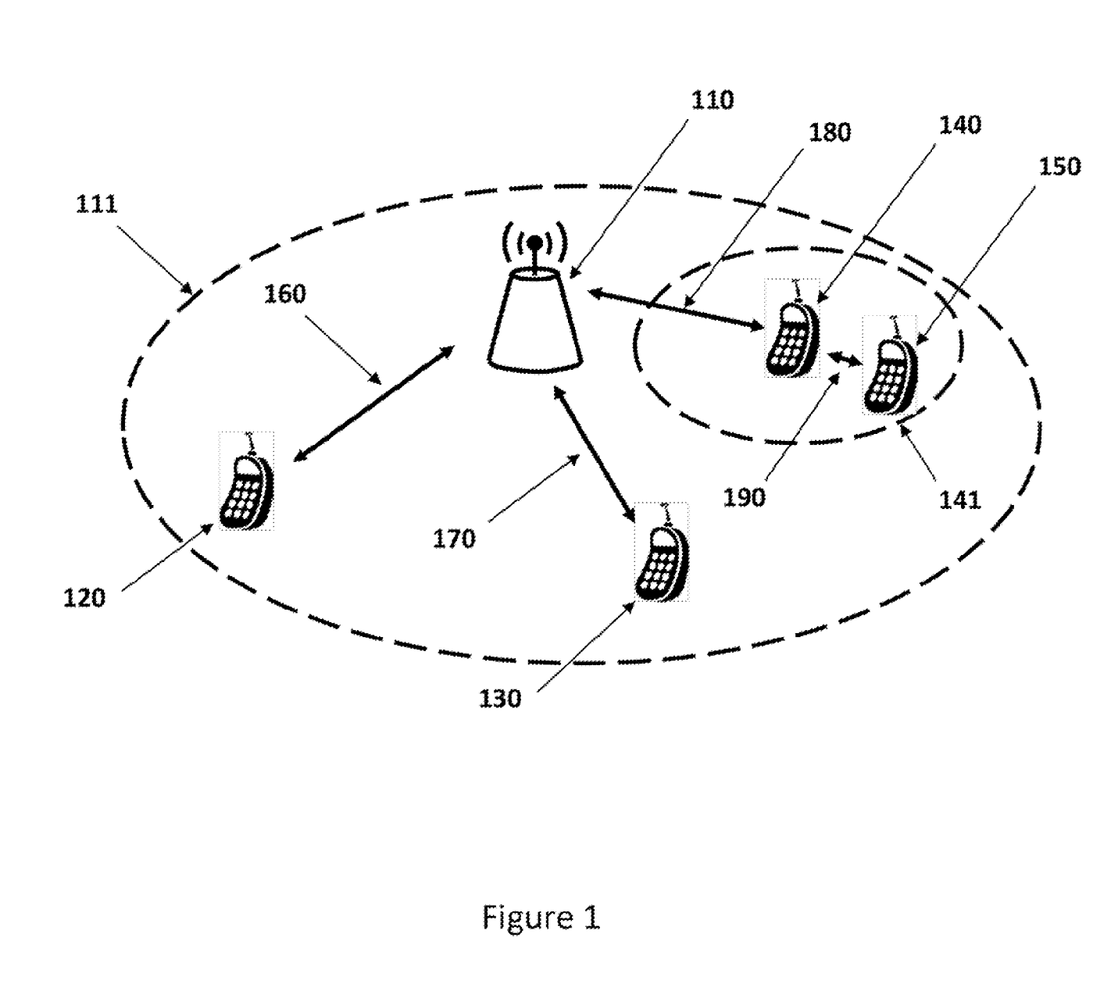
FIG. 1 is a system drawing showing a base station that communicates conventionally in a cellular network with user equipments and a user equipment that acts as a server in a personal cell, in accordance with an embodiment.

Referring to FIG. 1, illustrated is a system drawing showing an eNB 110 that communicates conventionally in a cellular network with UEs 120, 130, and a serving UE 140 that acts as a PCS-UE, illustrating an environment for application of the principles of an embodiment. The eNB 110 communicates with the conventional UEs 120, 130 over conventional uplink/downlink wireless communication links 160, 170, and with the serving UE 140 over the uplink/downlink wireless communication link 180. The served area of the eNB 110 is indicated by the dashed line 111, and the presumably smaller served area of the serving UE 140 is indicated by the dashed line 141. The serving UE 140 communicates over a D2D wireless communication link 190 with a client UE 150.

In operation, the eNB designates which UE will operate as the PCS-UE and which UE will operate as the PCC-UE. For each D2D grouping, there may be one PCS-UE and one or more PCC-UEs. The eNB's response may be in response to a request from a UE to operate with D2D communication with one or more other UEs. Also, the eNB can initiate D2D communications among UEs in its served area.

The eNB allocates and transmits information that is needed for a personal cell setup such as a cell identification ("Cell ID"), a pilot-tone pattern, PC start and stop times, PC carrier frequency, bandwidth to be used for the PC cell, transmitter power level, scheduling rules, etc. During a PC D2D connection, the eNB indicates and updates new scheduling rules and/or transmitter power level to the PCS-UE so that it can operate with better resource utilization and incur less mutual interference among UEs within its served area.

When a UE that desires to operate as a PCS-UE receives information from an eNB about PC setup-related information, the PCS-UE can operate as a normal UE within the served area of the eNB. For example, from time to time the PCS-UE stops transmitting within its own PC and returns to normal cellular network operation to communicate with its serving eNB. The main purpose for the PCS-UE to return to normal cellular network operation may include obtaining an update on the PC scheduling rule, checking if there is any cellular downlink ("DL") traffic directed to the UE, and transmitting cellular uplink ("UL") traffic to the eNB that it may desire to originate. The PCS-UE transmits pilot-tone and control channel information with a transmitter power level. The transmitter power level can be predetermined or can be specified by the serving eNB. The PCS-UE prepares access channel reception for possible PCC-UEs with whom it may desire to directly communicate.

Once a PCC-UE successfully accesses a PCS-UE, the PCS-UE schedules downlink and uplink transmissions with its coupled PCC-UE in accordance with resources that can be allocated by its serving eNB, and begins transmission and reception of traffic with the PCC-UE.

When all needed traffic has been exchanged between the PCS-UE and any PCC-UEs, the PCS-UE signals completion of traffic to the serving eNB and to the PCC-UEs to terminate the current D2D link(s).

When a PCC-UE receives information from an eNB about PC setup-related information, the PCC-UE starts a cell acquisition process toward the identified PC. From time to time to PCC-UE returns to its serving eNB for normal cellular communication. Reasons for this communication may include checking if there is any DL traffic for this UE in the cellular network, and transmitting cellular UL traffic that it may need to originate. For the PCC-UE, the PC and the cellular network are transparent to each other except for the PC's pilot tones and control-channel information which is generally transmitted in a discontinuous manner.

When the PCC-UE receives an indication of termination of the D2D link from the PCS-UE, it switches back to normal cellular communication with its serving eNB.

Even though PC UEs are directly connected with each other over a D2D communication link, they also retain a cellular connection to a normal cellular network. To allow this feature, the eNB transmits discontinuous receive ("DRX") and discontinuous transmit ("DTX") patterns for the PC to use. The eNB allocates both PCS-UE and PCC-UE periodic DRX/DTX patterns for which cellular information is enabled or disabled.

A PCS-UE and a PCC-UE utilize an allocated D2D link only during the time when cellular information is not expected to be received or transmitted, i.e., during assigned DRX/DTX off periods. The eNB does not expect any transmitted and received data to and from both the PCS-UE and the PCC-UE to which the D2D link has been allocated.

The PCC-UE generally searches for broadcasted PCell ID only during the time period that the D2D link is expected to be used.

Figure 2:
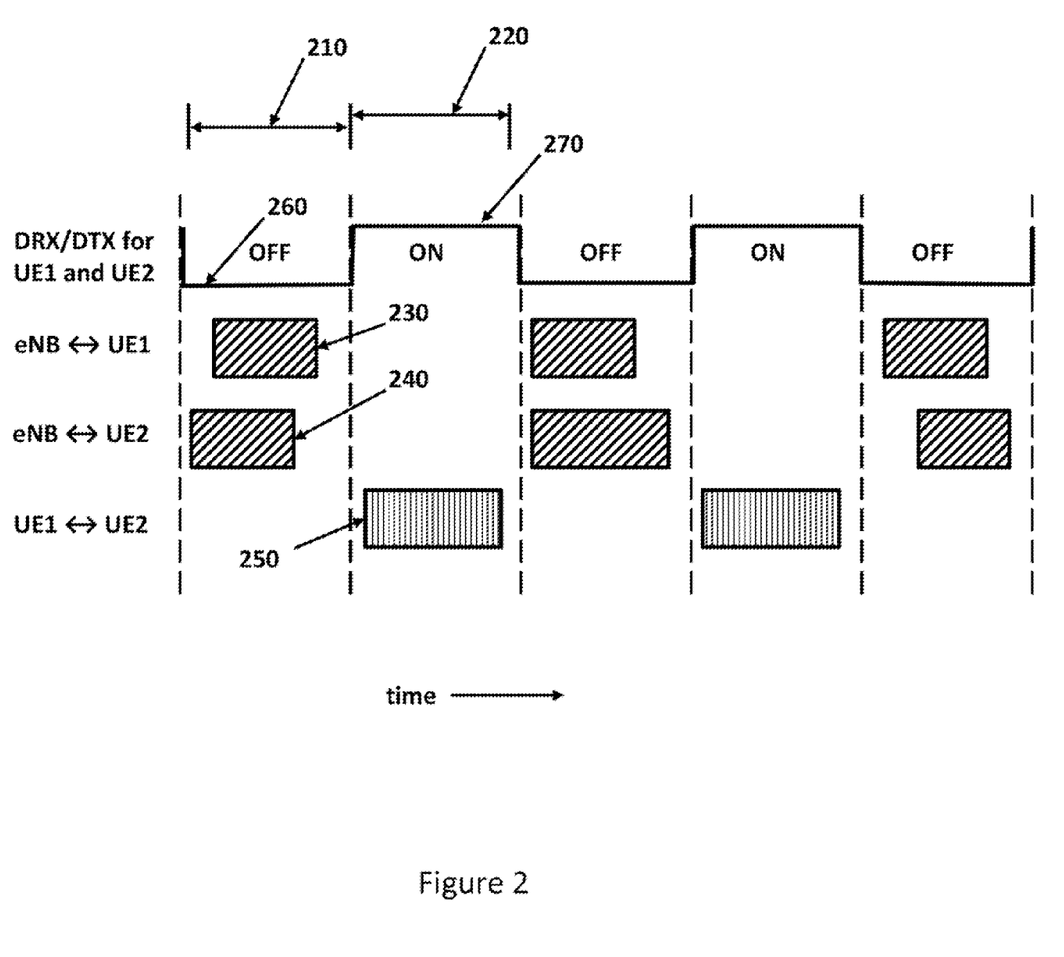
FIG. 2 is a drawing showing timing relationships for coexistence between a personal cell device-to-device communication link and a normal cellular link, in accordance with an embodiment.

Referring now to FIG. 2, illustrated is a drawing showing timing relationships for coexistence between a PC D2D communication link and a normal cellular link, illustrating an environment for application of the principles of an embodiment. Even though PC UEs may be directly connected with each other, they also maintain a communication link to a normal cellular network. To allow this feature, the eNB signals DRX/DTX patterns for this PC. The eNB signals a periodic DRX/DTX pattern to both the PCS-UE and the PCC-UE during which cellular transmissions are enabled and disabled. The PCS-UE and the PCC-UE use the D2D communication link only during a timeframe in which cellular transmissions are not expected, i.e., during DRX/DTX "on" durations. The eNB does not expect transmitted and/or received data to and from both the PCS-UE and the PCC-UE when the D2D communication link has been assigned to be enabled. The PCC-UE searches for PCell ID only during the time period that the D2D communication link is assigned to be enabled.

In FIG. 2, the time intervals 210, 220 represent frames along a time axis employed for cellular communication between a UE and an eNB. The rectangle 230 represents a group of time slots in the frame 210 employed by an eNB and a first UE, UE1, to communicate on a radio resource in the cellular network. The rectangle 240 represents another group of time slots employed by the eNB and a second UE, UE2, to substantially simultaneously communicate on a different radio resource in the cellular network. The time slots 230 and 240 can overlap in time because the respective communication links are allocated to different frequency resources or are modulated with an orthogonally different pattern. UE1 and UE2 do not communicate over the D2D communication link during the frame 210 as represented by the "off" period 260.

During the "on" period 270, UE1 communicates with UE2 over a D2D communication link. The frame 250 does not overlap the frames 230 and 240, and consequently the UEs can employ the same carrier frequencies for a D2D communication link that may be allocated to UE1 and UE2 to communicate with the eNB. The sequencing of frames 210, 220 can be repeated as illustrated in FIG. 2.

Benefits of enabling a UE to temporarily operate as a base station include an ability to enable simultaneous operation of cellular and D2D communication links in a cellular network. An embodiment enables a cellular operator to have control of D2D links. An embodiment can support D2D communication links with only modest modification of current cellular specifications and operation. An eNB can control and manage Cell IDs for D2D usage.

D2D and cellular operation can employ different component carriers and the PCS-UE and the PCC-UE can simultaneously transmit and receive both cellular and D2D traffic.

In a conventional wireless communication system, a wireless access point such as a base station continuously broadcasts a beacon signal to potential UEs that contains access point identification ("ID") information. The UEs periodically scan available beacon signals to obtain access point ID information. Once a UE identifies a desired access point and obtains access point ID information, it begins an association process to establish a communication link with the access point.

When a UE desires to communicate directly with another UE, it conventionally broadcasts beacon signals continuously, which consumes a substantial amount of battery energy. As a consequence of continuous broadcasting of beacon signals, the UE also generates a substantial level of interference for other UEs and for networks that may share the same radio spectrum.

In an embodiment of a new user discovery process for D2D communication under a cellular network, this operational inefficiency is prevented by a UE transmitting a beacon signal when it is determined, e.g., by a serving base station, that one or more other UEs with which the UE would desire to establish a D2D communication link are nearby.

To support the new user discovery process, the cellular network maintains a possible D2D connection list for its end-users. Each time the cellular network determines that two or more UEs are candidate partners for a D2D communication link, the serving eNB signals these UEs to initiate the user equipment discovery process. The required power consumption for user discovery can be substantially reduced, which produces a corresponding extension to UE battery life and generally reduces interference. Reduced interference is advantageous not only for communication among D2D links, but also between D2D links and the overlying cellular system. Discovery delays associated with establishing D2D links are also reduced Because the coverage of a D2D connection is much smaller than that of cellular coverage, most D2D connections will be established within the coverage area of a cellular cell. In a cellular network, an eNB (or, in general, herein, the network) retains information for all UEs operating within its coverage area. Thus, for each UE operating within its coverage area, an eNB and/or the network determines when there is a possible peer for a D2D communication link.

D2D user discovery is initiated when an eNB and/or the network determines that two or more D2D peers exist in the same cell or paging area, and then signals these UEs to initiate the user discovery process. In this manner, unnecessary broadcast signaling is not be performed by a UE to discover a D2D peer, which can improve the UE's power consumption stemming from initiating D2D communications.

Depending on a UE's capability, a number of embodiments are constructed.

In a first embodiment, each UE maintains its own list of candidate D2D users in a buddy list ("BL"). A UE's BL contains an ID of each user with which this UE would desire or may agree to be connected using a D2D link. Each UE transmits a copy of its BL to its serving eNB. In an embodiment, each UE's BL can be registered and modified not only by a cellular link, but also by on-line access via the Internet. Thus, each UE's BL is managed by the network, and can be identified by its serving eNB. The network operator/eNB constructs its own combined BL for UEs operating within its system, and each eNB maintains a combined BL of UEs in its coverage area that it controls. The eNB and/or the network checks if there are UEs within its coverage area that are in the BL of another UE. For example, UE1 may be in the BL of UE2, and at the same time UE2 may be in the BL of UE1. When this happens, the eNB and/or the network signals these UEs to check the desire and possibility of establishing a D2D connection between these UEs. The UEs, if desiring, then initiate a user discovery procedure. Specific user discovery procedures can vary depending on the used D2D protocol.

The eNB can also provide D2D link setup information for better D2D user discovery performance. D2D link setup information can vary depending on the used D2D communication protocol. Following the personal cell process described previously hereinabove to establish D2D communications between UEs, D2D setup information may include a designation of which UE is the PCS-UE, and which UE is the PCC-UE, Cell ID (PCell ID), and a DRX pattern. The following information can also be optionally transmitted by a serving eNB for better communication performance: a pilot pattern, PCell start time, PCell carrier frequency, PCell bandwidth, transmitter power level, a scheduling rule, etc. Of course, a D2D communication link need not be operated as a personal cell.

In an embodiment, the eNB/the network requests UEs that are candidates for a D2D communication link to report their current geographic location to the eNB. After the eNB identifies the locations of these UEs, when a distance between these UEs is less than a threshold value, the eNB/the network signals the UEs to check the possibility of establishing a D2D connection. The UEs then initiates the user discovery procedure. Global positioning system ("GPS"), assisted global positioning system ("aGPS"), Wi-Fi hotspot information, and other related location processes and systems can be employed to obtain geographic location information for each UE. By employing such processes, the probability of failed attempts to establish D2D communication links between the end users can be reduced.

An eNB and/or the network signals to a UE that another UE on its BL is currently in the same cell. If at least one of these UEs indicates to the eNB and/or the network that it desires to initiate a connection with the other UE, then the eNB and/or the network signals these UEs to check the possibility of establishing a D2D connection. When these UEs are close enough to be connected by a D2D link, they can connect directly to each other with a D2D link. If these UEs are too far apart to establish a D2D link, then several options are available. One option is not to connect to each other at this time. Another option is to connect to each other employing a normal cellular link through the base station.

In an embodiment, each eNB shares its UE BL information with adjacent eNBs and/or the network from time to time. Each eNB checks if there are UEs in its coverage area that are in the BL of other UEs in the coverage area of an adjacent eNB. For example, UE1 in cell A is in BL of UE2 in adjacent cell B, and at the same time UE2 is in the BL of UE1. In this case, the eNB can further determine the signal strength of both UEs to both eNBs. If the signal strength of a UE to an adjacent cell is greater than that to its home cell minus a given threshold value, the eNBs signal to the UEs and their respective coverage areas to check the possibility of a D2D connection. The UEs can then initiate a user discovery procedure.

Possible peer UEs in a BL can be divided into different categories. In a first category, the owner of the BL includes UEs as possible peer UEs that are, e.g., friends, family members, etc. In a second category, the UE broadcasts/multicasts its ID within the coverage area of the specific eNB in which this UE is operating. When a UE enters the cell of a specific eNB, the eNB and/or the network can initiate D2D user discovery process for these UEs. A UE may be provided with an option to disallow certain second category UEs in its BL. An example of an UE that might be disallowed is one broadcasting local advertisements.

In an embodiment, each UE that is included in the BL of another UE can enable and disable being identified for D2D communication by the other UE in its user discovery phase. For example, UE1 and UE2 are each in the BL of the other UE. UE1 disabled its presence in the BL of UE2. Even if UE1 and UE2 are located close to each other, UE2 cannot find UE1 because UE1 is disabled in the BL of UE2. UE2 can thus preserve its privacy in a search for a D2D link.

By enabling an eNB (or the network) to retain BL information for UEs operating within its coverage area, signaling overhead and energy consumption for D2D user discovery can be substantially reduced. Interference among D2D links within a given geographic area and with the cellular network due to reduced signaling can also be substantially reduced. After an eNB and/or the network identifies a possible D2D link, it can provide information that can facilitate setup of the D2D link.

Thus, an eNB and/or the network determines when to initiate a D2D discovery process for end users. Each end user's possible peer user information is stored in the cellular network. Accordingly, each eNB and/or the network contains peer user information of each UE within its coverage area. A D2D end-user discovery process is initiated when possible end user peers are operating within the same cell coverage area. Use of each UE's geographical location can be employed to improve a possible D2D link set up. Even though UEs are operating within the same cell coverage area, when the distance between these UEs is too far for a D2D link to be set up, they can still communicate with each other using the normal cellular network. The eNB can share BL information with adjacent eNBs so that two UEs operating in in adjacent cells can set up a D2D link when the eNB determines that both UEs are near the cell boundary by checking signal strength between the UEs and the eNBs. In addition to normal end user peers, broadcasting end users can be included in or excluded from in the BL of each UE. Two different types of UEs can be included in their respective BLs. One type is for a peer-to-peer link, and the other type is for broadcasting/multicasting services such as for local advertisements.

Figure 3:
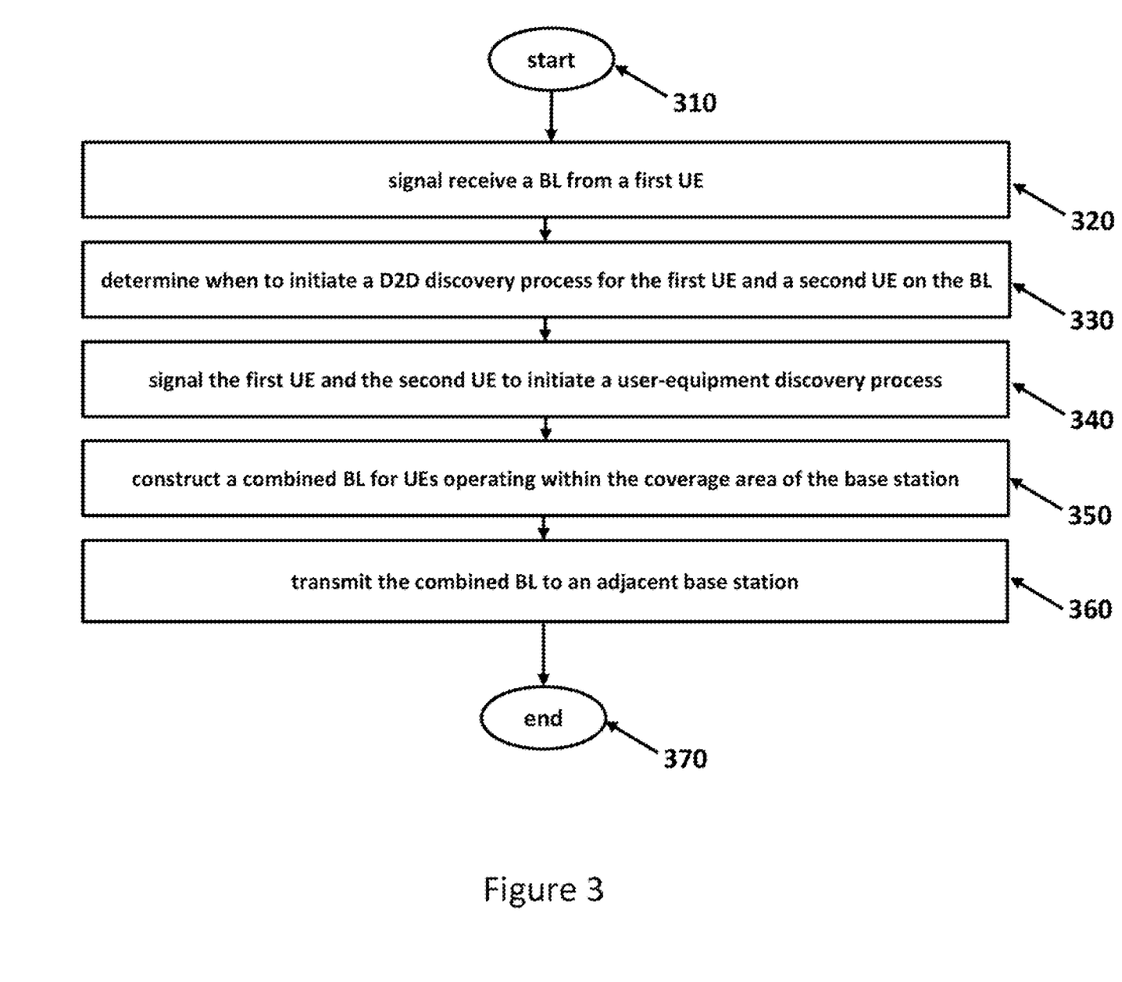
FIG. 3 illustrates a flowchart of a method for a base station to use a buddy list received from a UE to determine when to initiate a device-to-device discovery process for the UE, in accordance with an embodiment.

Referring now to FIG. 3, illustrated is a flowchart of a method for a base station to use a buddy list received from a UE to determine when to initiate a device-to-device discovery process for the UE, in accordance with an embodiment. The method functionally begins in a step or module 310. In step or module 320, the base station receives a buddy list from the first UE. The buddy list includes the ID of a second UE with which the first UE would desire to be connected using a D2D communication link. In step or module 330 the base station determines when to initiate a D2D discovery process for the first UE and the second UE that is on the buddy list of the first UE. The determination when to initiate the UE discovery process optionally includes a determination of a distance between the first UE and the second UE less than a threshold value, particularly for the case when the eNB has GPS location information from the UE. In step or module 340 the base station signals the first UE and the second UE to initiate the user-equipment discovery process. The signaling to the first UE and to the second UE to initiate the UE discovery process includes providing D2D communication link setup information to the first UE and to the second UE. The signaling to the first UE and to the second UE to initiate the UE discovery process includes signaling a cell ID, a DRX pattern, and whether one of the UEs is a serving UE. In step or module 350, the base station optionally can construct a combined buddy list for UEs operating within the coverage area of the base station. In step or module 360 the base station can optionally transmit the combined buddy list to an adjacent base station. The method functionally ends in step or module 370.

Figure 4:
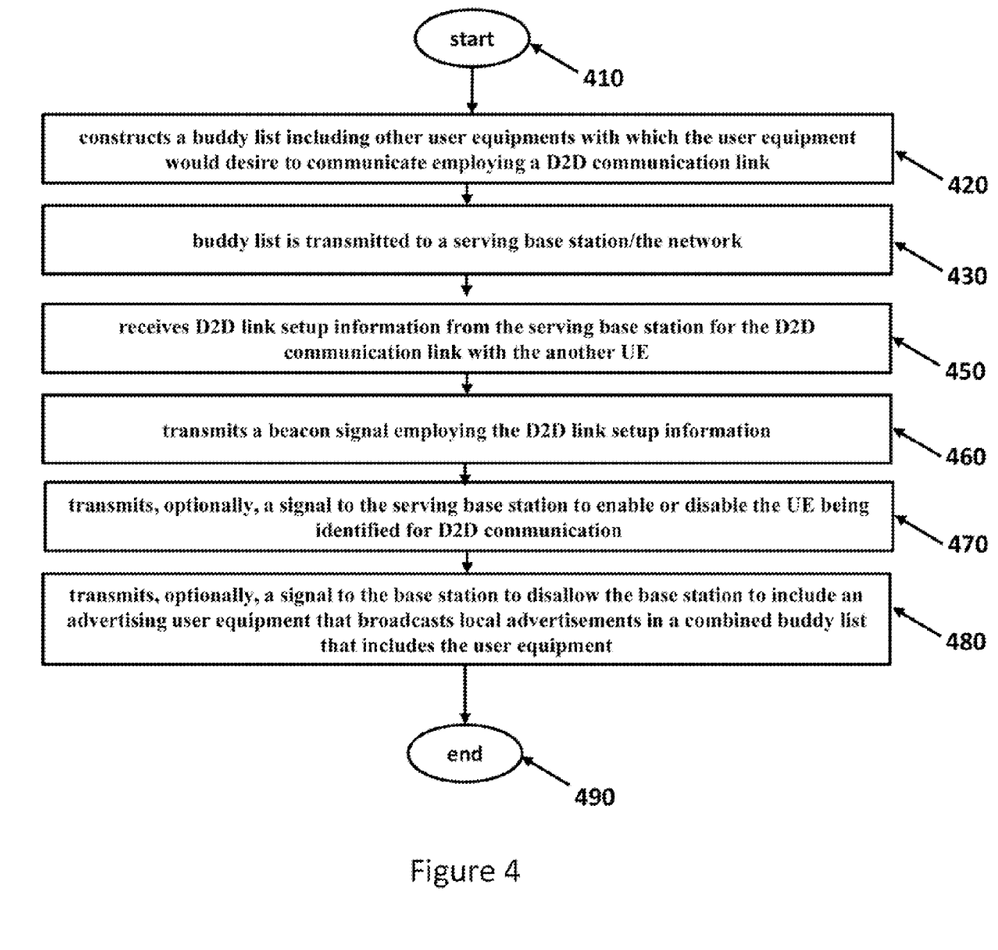
FIG. 4 illustrates a flowchart of a method for a UE to employ a buddy list to initiate a D2D discovery process, in accordance with an embodiment.

Referring now to FIG. 4, illustrated is a flowchart of a method for a UE to employ a buddy list to initiate a D2D discovery process, in accordance with an embodiment. The method functionally begins in a step or module 410. In step or module 420, the UE constructs a BL including user equipments with which the apparatus would desire to communicate employing a D2D communication link. In step or module 430, the UE optionally transmits the BL to a serving base station. In an alternative embodiment, an operator of the UE communicates the BL to the network employing a wireline service, e.g., over the Internet. In step or module 450, the UE receives D2D link setup information from the serving base station for the communication link with the second UE. In step or module 460, as the UE starts the D2D link setup process, the UE transmits a beacon signal employing the D2D link setup information. The D2D link setup information can include a Cell ID and a DRX pattern. In step or module 470, the UE transmits, optionally, a signal to the serving base station to enable or disable the UE being identified for D2D communication. In step or module 480, the UE, optionally, transmits a signal to the serving base station to disallow the base station to include an advertising user equipment that broadcasts local advertisements in a combined BL that includes the apparatus.

Although embodiments described hereinabove operate within the specifications of a cellular communication network such as a 3GPP-LTE cellular network, other wireless communication arrangements are contemplated within the broad scope of an embodiment, including WiMAX, GSM, Wi-Fi, and other wireless communication systems. Accordingly, the term cellular as used herein includes such other wireless communication arrangements and networks.

It is noted that, unless indicated otherwise, functions described herein can be performed in either hardware or software, or some combination thereof, with or without human intervention. In an embodiment, the functions are performed by a processor such as a computer or an electronic data processor, such as that discussed hereinbelow with reference to FIG. 5, in accordance with code such as computer program code, software, and/or integrated circuits that are coded to perform such functions, unless indicated otherwise.

Figure 5:
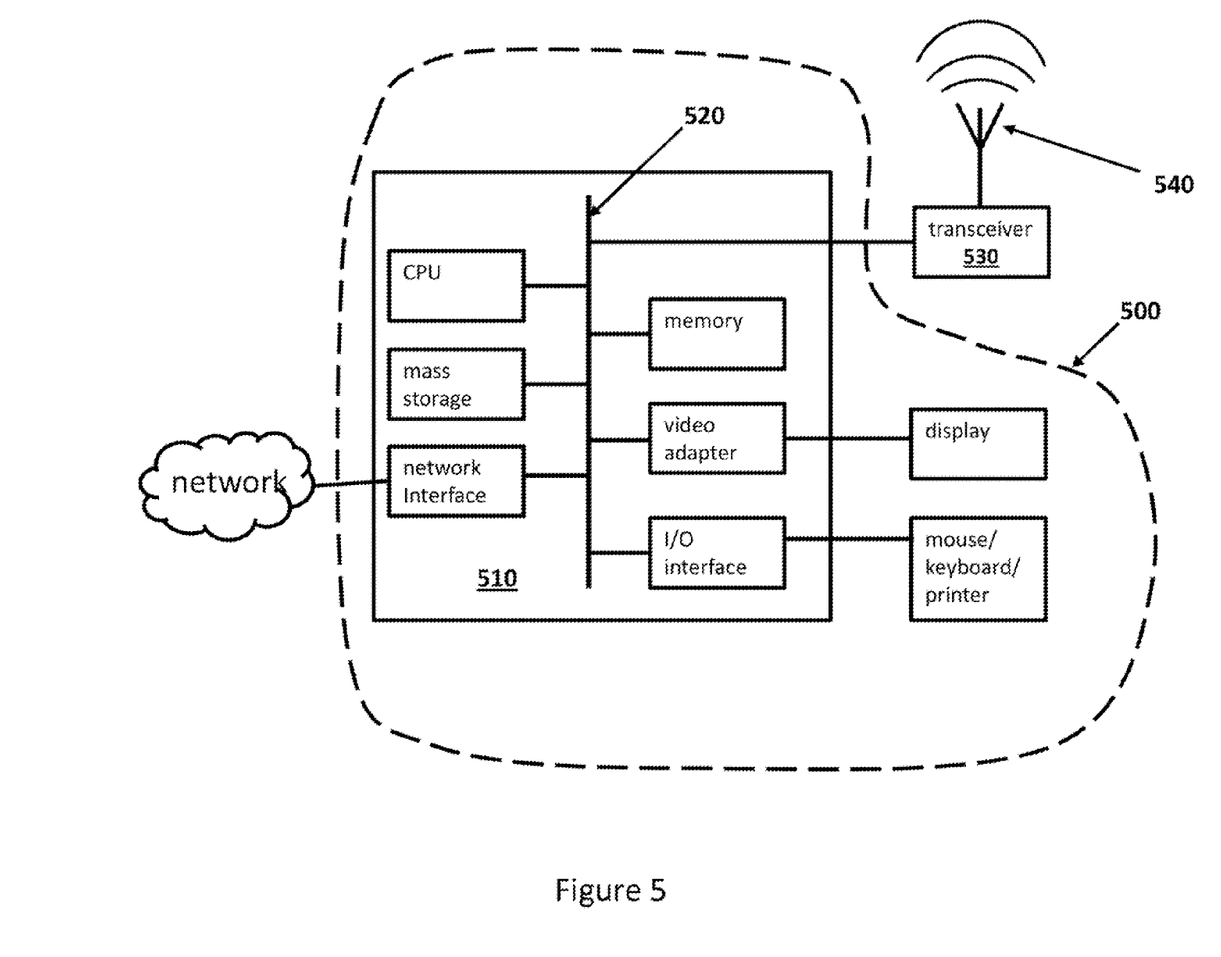
FIG. 5 illustrates a block diagram of elements of a processing system that may be used to perform one or more of the processes discussed hereinabove.

Referring now to FIG. 5, illustrated is a block diagram of elements of a processing system 500 that may be used to perform one or more of the processes discussed hereinabove. The processing system 500 may comprise a processor 510 equipped with one or more input/output devices, such as a mouse, a keyboard, a printer, or the like, and a display. The processor 510 may include a central processing unit (CPU), memory, a mass storage device, a video adapter, a network interface, and an I/O interface connected to a bus 520. Certain elements illustrated in FIG. 5 may not be present in certain processing systems, for example, a processing system in a cellular telephone that does not include a printer or network interface.

The bus 520 may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for data storage for use while executing programs.

A transceiver 530 coupled to an antenna 540 is coupled to the bus 520 to provide a wireless transmitting and a receiving function for the processing system. For example, without limitation, the transceiver 530 may provide a wireless transmitting and receiving function for a cellular communication network.

The mass storage device may comprise any type of storage device configured to store data, programs, and other information and to make the data, programs, and other information accessible via the bus. The mass storage device may comprise, for example, one or more of a hard disk drive, a magnetic disk drive, an optical disk drive, or the like.

The video adapter and the I/O interface provide interfaces to couple external input and output devices to the processor. Examples of input and output devices include the display coupled to the video adapter and the mouse/keyboard/printer coupled to the I/O interface. Other devices may be coupled to the processor, and additional or fewer interface cards may be utilized. For example, a serial interface card (not shown) may be used to provide a serial interface for a printer.

The processor also preferably includes a network interface, which can be a wired link, such as an Ethernet cable or the like, and/or a wireless link to enable communication with a network such as a cellular communication network. The network interface allows the processor to communicate with remote units via the network. In an embodiment, the processor is coupled to a local-area network or a wide-area network to provide communications to remote devices, such as other processors, the Internet, remote storage facilities, or the like.

It should be noted that the processing system may include other components. For example, the processing system may include power supplies, cables, a motherboard, removable storage media, cases, and the like. These other components, although not shown, are considered part of the processing system.

Embodiments such as those presented herein provide a system and a method for a base station to use a buddy list received from a user equipment to determine when to initiate a device-to-device discovery process for the user equipment. For example, embodiments such as those disclosed herein provide a base station constructed with a transceiver and a processor coupled to the transceiver. The processor in conjunction with the transceiver is configured to receive a buddy list of a user equipment to determine when to initiate a device-to-device discovery process for the user equipment. The buddy list can be received wirelessly from the user equipment, or over a wireline connection, such as via the Internet. The buddy list is received from a first UE and includes the ID of a second (or more) UE(s) with which the first UE would desire to be connected using a D2D communication link. The processor determines when to initiate a D2D discovery process for the first UE and the second UE that is on the buddy list. The determination when to initiate the UE discovery process can include a determination of a distance, such as determined by a GPS location data, between the first UE and the second UE less than a threshold value. The base station signals the first UE and the second UE to initiate a user-equipment discovery process. The signaling to the first UE and to the second UE to initiate the UE discovery process can include providing D2D communication link setup information to the first UE and to the second UE. The signaling to the first UE and to the second UE to initiate the UE discovery process can include signaling a cell ID, a DRX pattern, and whether one of the UEs is a serving UE. The processor can construct a combined buddy list for UEs operating within the coverage area of the base station. The base station, employing the processor and the transceiver, transmits the combined buddy list to an adjacent base station.

A further embodiment provides a system and a method for a UE to employ a buddy list to enable initiation of a D2D discovery process. The UE includes a transceiver and a processor coupled to the transceiver. The processor in conjunction with the transceiver is configured to cause the UE to construct a BL including other UEs with which the UE would desire to communicate employing a D2D communication link. The UE transmits the BL to a serving base station. In an alternative embodiment, the BL is transmitted to the serving base station or the network over a wireline communication path, such as the Internet. The UE receives D2D link setup information from the serving base station for the communication link with the second UE. The UE transmits a beacon signal employing the D2D link setup information. The D2D link setup information can include a Cell ID and a DRX pattern. The UE, optionally, transmits a signal to the serving base station to enable or disable the UE being identified for D2D communication. In an alternative embodiment, a message is transmitted to the serving base station or the network over a wireline connection, such as the Internet, to enable or disable the UE being identified for D2D communication. The UE, optionally, transmits a signal to the serving base station to disallow the base station to include an advertising user equipment that broadcasts local advertisements in a combined BL that includes the UE. In an alternative embodiment, a message is transmitted to the serving base station or the network over a wireline connection, such as Internet, to disallow the base station to include an advertising user equipment that broadcasts local advertisements in a combined BL that includes the UE.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A base station comprising:
   a transceiver; and
   a processor coupled to the transceiver, the processor, in conjunction with the transceiver, configured to
   receive a buddy list ("BL") of a first user equipment ("UE"),
   determine when to initiate a device-to-device ("D2D") discovery process for the first user equipment and another UE on the BL, wherein the BL includes an identifier ("ID") of the another UE with which the first UE would desire to be connected using a D2D communication link, and
   signal the first UE and the another UE to initiate a user equipment discovery process.

2. The base station as recited in claim 1 wherein the processor, in conjunction with the transceiver, is further configured to construct a combined BL for UEs operating within a coverage area of the base station, the combined BL including the BL received from the first UE.

3. The base station as recited in claim 2 wherein the processor, in conjunction with the transceiver, is further configured to transmit the combined BL to another base station adjacent the base station.

4. The base station as recited in claim 1 wherein the processor, in conjunction with the transceiver, configured to determine when to initiate the user equipment discovery process further comprises the processor, in conjunction with the transceiver, configured to determine a distance between the first UE and the another UE less than a threshold value.

5. The base station as recited in claim 1 wherein the processor, in conjunction with the transceiver, is configured to receive the BL over a wireline communication path.

6. The base station as recited in claim 1 wherein the processor, in conjunction with the transceiver, configured to signal the first UE and the another UE to initiate the user equipment discovery process further comprises the processor, in conjunction with the transceiver, configured to provide D2D communication link setup information to the first UE and to the another UE.

7. The base station as recited in claim 1 wherein the processor, in conjunction with the transceiver, configured to signal the first UE and the another UE to initiate the user equipment discovery process further comprises the processor, in conjunction with the transceiver, configured to signal a Cell ID, a discontinuous receive ("DRX") pattern, and which UE is a serving UE.

8. The base station as recited in claim 1 wherein the BL contains an ID of each user equipment with which the first user equipment would desire to be connected using a D2D link.

9. A method for operating a first base station, the method comprising:
   receiving a buddy list ("BL") from a first user equipment ("UE");
   determining when to initiate a device-to-device ("D2D") discovery process for the first UE and another UE on the BL, wherein the BL includes an identifier ("ID") of the another UE with which the first UE would desire to be connected using a D2D communication link; and
   signaling the first UE and the another UE to initiate a user equipment discovery process.

10. The method as recited in claim 9, further comprising constructing a combined BL of UEs operating within its coverage area including the BL received from the first UE.

11. The method as recited in claim 10, further comprising transmitting the combined BL to another base station adjacent the first base station.

12. The method as recited in claim 9, wherein the signaling the first UE and the another UE to initiate the user equipment discovery process includes providing D2D link setup information to the first UE and to the another UE.

13. The method as recited in claim 9 wherein determining when to initiate the user equipment discovery process further comprises determining a distance between the first UE and the another UE less than a threshold value.

14. The method as recited in claim 9, further comprising receiving the BL over a wireline communication path.

15. The method as recited in claim 9 wherein signaling the first UE and the another UE to initiate the user equipment discovery process includes signaling a Cell ID, a discontinuous receive ("DRX") pattern, and which UE is a serving UE.

16. The method as recited in claim 9 wherein the BL contains an ID of each user equipment with which the first user equipment would desire to be connected using a D2D link.

17. A base station comprising:
    a transceiver; and
    a processor coupled to the transceiver, the processor, in conjunction with the transceiver, configured to
    receive a buddy list ("BL") of a first user equipment ("UE"),
    determine when to initiate a device-to-device ("D2D") discovery process for the first user equipment and another UE on the BL,
    signal the first UE and the another UE to initiate a user equipment discovery process, and
    construct a combined BL for UEs operating within a coverage area of the base station, the combined BL including the BL received from the first UE.

18. A base station comprising:
    a transceiver; and
    a processor coupled to the transceiver, the processor, in conjunction with the transceiver, configured to
    receive a buddy list ("BL") of a first user equipment ("UE"),
    determine when to initiate a device-to-device ("D2D") discovery process for the first user equipment and another UE on the BL, and
    signal the first UE and the another UE to initiate a user equipment discovery process, including to signal a Cell ID, a discontinuous receive ("DRX") pattern, and which of the first UE and the another UE is a serving UE.

19. A method for operating a first base station, the method comprising:
    receiving a buddy list ("BL") from a first user equipment ("UE");
    determining when to initiate a device-to-device ("D2D") discovery process for the first UE and another UE on the BL;
    signaling the first UE and the another UE to initiate a user equipment discovery process; and constructing a combined BL for UEs operating within a coverage area of the base station, the combined BL including the BL received from the first UE.

20. A method for operating a first base station, the method comprising:

receiving a buddy list ("BL") from a first user equipment ("UE");

determining when to initiate a device-to-device ("D2D") discovery process for the first UE and another UE on the BL; and signaling the first UE and the another UE to initiate a user equipment discovery process, including signaling a Cell ID, a discontinuous receive ("DRX") pattern, and which of the first UE and the another UE is a serving UE.

* * * * *